United States Patent
Reisner et al.

[15] 3,684,805
[45] Aug. 15, 1972

[54] 2,3,4,4A-TETRAHYDRO-10H-1,2-OXAZINO [3,2-B](1,3)BENZOXAZIN-10-ONES

[72] Inventors: David B. Reisner, Hightstown; Bernard J. Ludwig, North Brunswick; Harold M. Bates, Nutley; Frank M. Berger, Princeton, all of N.J.

[73] Assignee: Carter-Wallace, Inc., New York, N.Y.

[22] Filed: March 24, 1969

[21] Appl. No.: 809,930

[52] U.S. Cl.....................260/244 R, 424/248
[51] Int. Cl........................C07d 87/02, C07d 87/16
[58] Field of Search......................260/244

[56] References Cited

UNITED STATES PATENTS 3,355,453 11/1967 Hasspacher..............260/244

*Primary Examiner*—Henry R. Jiles
*Assistant Examiner*—Robert T. Bond
*Attorney*—Kevin B. Clarke

[57] ABSTRACT

Chemical compounds of the formula:

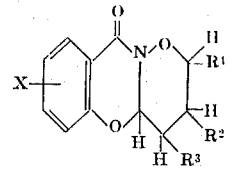

wherein X is hydrogen, hydroxy, halogen, lower alkyl, lower alkoxy, nitro, amino, acetamido, sulfonamido or trifluoromethyl, and each R is selected from the group consisting of hydrogen and lower alkyl. Said compounds have valuable anti-inflammatory activity in standard laboratory animals.

1 Claim, No Drawings

2,3,4,4A-TETRAHYDRO-10H-1,2-OXAZINO [3,2-B](1,3)BENZOXAZIN-10-ONES

The present invention relates to novel chemical compounds. More particularly, the invention relates to novel compounds which possess useful pharmacological properties.

The compounds of the present invention, which can be classified as 2,3,4,4a-tetrahydro-1OH-1,2-oxazino(3,2-b) (1,3)benzoxazin-10-ones, can be represented by the following general formula:

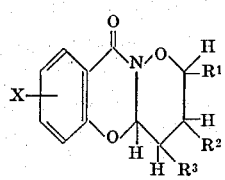

wherein X is hydrogen, hydroxy, halogen, lower alkyl, lower alkoxy, nitro, amino, acetamido, sulfonamido or trifluoromethyl, and each R is selected from the group consisting of hydrogen and lower alkyl. When X is amino, the compounds can be used in the form of their non-toxic pharmaceutically acceptable acid addition salts, such as the hydrochloride, citrate, maleate, and the like. As used herein and in the appended claims, the terms "lower alkyl" and "lower alkoxy" signify alkyl and alkoxy radicals having from one to six carbon atoms.

The compounds of the invention can be conveniently prepared according to the following synthetic route:

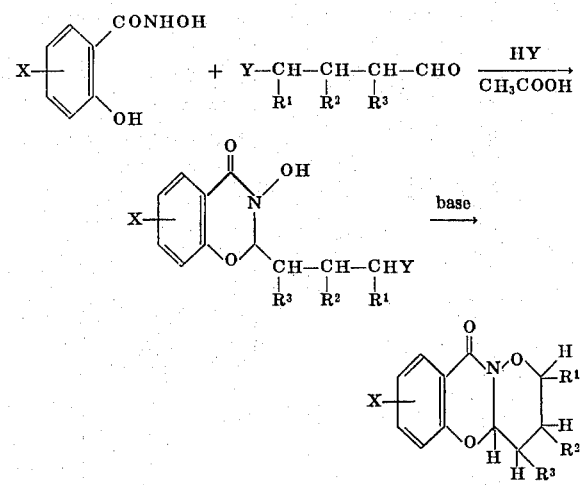

In the first reaction step, a salicylhydroxamic acid, substituted or unsubstituted, is reacted with the appropriate halo-aldehyde or its acetal, in a medium such as acetic acid or ethanol, in the presence of hydrogen halide, to yield the desired intermediate. The reaction is carried out at a temperature of from about 20° C. to about 70°C. The intermediates, which can be classified as 2-(3-halopropyl)-2,3-dihydro-3-hydroxy-4H-1,3-benzoxazin-4-ones, are novel compounds.

Cylization of the intermediate under basic conditions yields the desired products. Said cyclization can be carried out using organic or inorganic bases in polar solvents.

The following Examples illustrate the preparation of 8-chloro-2,3,4,4a-tetrahydro-1OH-1,2-oxazino(3,2-b)(1,3)benzoaxazin-10-one.

EXAMPLE 1

Preparation of 6-chloro-2-(3-chloropropyl)-2,3-dihydro-3-hydroxy-4H-1,3-benzoxazin-4-one To 250 ml of glacial acetic acid saturated with hydrogen chloride gas was added to 37 g of 5-chlorosalicylhydroxamic acid. 4-Chlorobutyraldehyde diethyl acetal (34 g) and 50 ml of glacial acetic acid saturated with hydrogen chloride gas were then added simultaneously with stirring at a rate to maintain a temperature of 25° to 40°C. The resulting mixture was stirred and heated at 55° to 60°C. for 2 hours and then allowed to stand at room temperature overnight. Mixture was poured into a mixture of ice and water, and when oil solidified it was removed by filtrating, washed with water, and air-dried. The crude product weighed 31.5 g and melted at 70°–75°C. A sample recrystallized from ligroin melted at 80°–81°C.

EXAMPLE 2

Preparation of 8-chloro-2,3,4,4a-tetrahydro-1OH-1,2-oxazino(3,2-b)(1,3)benzoxazin-10-one A mixture of 10 g of crude 6-chloro-2-(3-chloropropyl)-2,3-dihydro-3-hydroxy-4H-1,3-benzoxazin-4-one and 50 ml of 15 percent aqueous solution of ammonium hydroxide was stirred for 5 hours at room temperature and then filtered and washed with water. The crude product (6 g) was recrystallized from 45 ml of ethanol yielding 3.8 g, mp 148°–149°C.

Anal. Calcd. for $C_{11}H_{10}ClNO_3$: C, 55.14; H, 4.20; N, 5.83.
Fd.: C, 55.42; H, 4.34; N, 5.73.

By using a salicylhydroxamic acid having more than one substitutuent thereon, i.e., dialkyl, dihalo or haloalkyl, compounds such as the 6,8-dichloro, 6,8-dimethyl and 6-chloro-7-methyl derivatives can be prepared.

The compounds of the present invention are useful as a result of their valuable pharamacological properties, for example, they are valuable anti-inflammatory agents, as evidenced by their ability to inhibit the local edema formation characteristic of inflammatory states when administered systemically to warm-blooded animals.

The procedure described below (Winters et al., Proc. Soc., Exp. Biol. Med., 111 , 544, 1962) was used to extablish the effectiveness of these compounds in the hind paw edema induced by carrageenin in the rat. This procedure is considered suitable for demonstrating anti-inflammatory activity of drug compounds in laboratory animals.

Male rats of the Sprague-Dawley strain (Charles River Laboratories) weighing 100 ± 20 grams were used for this study. Six animals were used for each drug dose. The drug was suspended in 1 percent aqueous solution of gum acacia, and each rat received 10 ml/kg of the appropriate concentration of drug suspension by oral intubation; controls were given a similar volume of the vehicle. One hour later, edema in the right hind paw was induced by the subplantar injection of 0.05 ml of 1 percent calcium carrageenin dissolved in 0.15N sodium chloride. The volume of the foot was determined immediately and again 3 hours later. The difference was recorded as edema volume. Foot volume was measured by immersion of the foot in water at the level of the lateral malleolus, and determining the volume of water displaced by the foot. The $ED_{50}$ may be defined as the dose in which edema formation is inhibited by 25 percent or more in 50 percent of the rats when compared to the mean value of the controls.

When tested by the method set forth above, the 8-chloro-2,3,4,4a-tetrahydro-10H-1,2-oxazin(3,2-b)(1,3) benzoxazin-10-one (Example 2) was found to have an $ED_{50}$ of about 100 mg/kg.

The pharmaceutical compositions of the present invention are prepared by incorporating the active ingredient with a suitable pharmaceutical carrier. The carrier must be of such nature that the novel compositions may be administered systemically to warm blooded animals. The term "systemically" as used herein, means a mode of administration whereby the active ingredient, when given to warm blooded animals, is effective in the whole body and not merely at the locus of application. This includes parenteral and other methods of administration.

The active ingredients of the present invention are preferably administered orally in the form of tablets or capsules. Suitable solid pharmaceutical carriers when can be utilized include, for example, starch, lactose, sucrose, glucose, gelatin, and the like. When the composition is in the form of a solid, the active ingredient is generally in the amount of from about 25–50 to about 95 percent by weight of the total composition.

The active ingredients of the invention can also be dissolved in a liquid pharmaceutical carrier, such as, for example, propylene glycol, polyethylene glycol, water, saline, and mixtures thereof, to form a solution suitable for injection. Such injectable solutions generally contain from about 0.05 gram to about 30 grams of active ingredient per 100 ml of solution.

What is claimed is:

1. 8-Chloro-2,3,4,4a-tetrahydro-10H-1,2-oxazino(3,2-b)(1,3)benzoxazin-10-one.

* * * * *